United States Patent
Moore (10) Patent No.: US 8,162,589 B2
(45) Date of Patent: Apr. 24, 2012

(54) MOVING FLUID ENERGY RECOVERY SYSTEM

(76) Inventor: Brian Moore, Calgary (CA)

(*) Notice: Subject to any disclaimer, the term of this patent is extended or adjusted under 35 U.S.C. 154(b) by 817 days.

(21) Appl. No.: 12/272,121

(22) Filed: Nov. 17, 2008

(65) Prior Publication Data

US 2010/0133845 A1   Jun. 3, 2010

(51) Int. Cl.
  *F03D 7/06* (2006.01)
(52) U.S. Cl. ....... 415/4.2; 415/4.4; 415/907; 416/197 R; 416/197 A; 416/DIG. 9; 290/44; 290/55; 29/889.2
(58) Field of Classification Search ............... 415/4.2, 415/4.4, 907; 416/197 R, 197 A, DIG. 9; 290/44, 55; 29/889.2
See application file for complete search history.

(56) References Cited

U.S. PATENT DOCUMENTS

| | | | |
|---|---|---|---|
| 1,766,765 A * | 6/1930 | Savonius | 416/132 R |
| 1,903,307 A | 4/1933 | Gillio | |
| 3,942,909 A | 3/1976 | Yengst | |
| 4,005,947 A | 2/1977 | Norton et al. | |
| 4,039,849 A | 8/1977 | Mater et al. | |
| 4,047,834 A * | 9/1977 | Magoveny et al. | 415/53.1 |
| 4,269,563 A * | 5/1981 | Sharak et al. | 415/186 |
| 4,288,200 A | 9/1981 | O'Hare | |
| 4,423,368 A | 12/1983 | Bussiere | |
| 4,437,698 A | 3/1984 | Tantalo | |
| 4,718,821 A * | 1/1988 | Clancy | 416/44 |
| 4,838,757 A * | 6/1989 | Benesh | 415/4.4 |
| 5,221,186 A | 6/1993 | Machin | |
| 5,287,004 A | 2/1994 | Finley | |
| 5,296,746 A | 3/1994 | Burkhardt | |
| 5,850,108 A | 12/1998 | Bernard | |
| 5,947,678 A | 9/1999 | Bergstein | |
| 6,172,429 B1 | 1/2001 | Russell | |
| 6,700,215 B2 | 3/2004 | Wu | |
| 6,882,059 B1 | 4/2005 | DePaoli | |
| 6,910,873 B2 * | 6/2005 | Kaliski | 418/267 |
| 7,094,017 B2 | 8/2006 | Kurita | |
| 7,220,107 B2 | 5/2007 | Kaneda | |
| 7,344,353 B2 * | 3/2008 | Naskali et al. | 415/4.2 |
| 2008/0179114 A1 | 7/2008 | Chen | |

FOREIGN PATENT DOCUMENTS

JP      2002106458 A      4/2002

* cited by examiner

*Primary Examiner* — Igor Kershteyn
(74) *Attorney, Agent, or Firm* — David A. Guerra (57) ABSTRACT

A moving fluid energy recovery system for generating electricity through rotational motion produced by positioning the present invention in a fluid flow produced by nature or a moving vehicle. The moving fluid energy recovery system has first and second end plates, a plurality of elongated inner vanes, a plurality of elongated outer vanes, and shaft to drive an electricity generating device. The inner and outer vanes each have a substantially curved profile featuring a curve side and an open side. The first and second end plates each has a central bore defined therethrough, a plurality of inner vane slots each shaped to receive a corresponding inner vane, and a plurality of outer vane slots each shaped to receive a corresponding outer vane. The inner vane slots are orientated with the curve side toward the central bore, and the outer vane slots are orientated with the open side toward the central bore with the free ends of adjacent inner vanes positioned in the open side of the outer vane slots.

20 Claims, 8 Drawing Sheets

MOVING FLUID ENERGY RECOVERY SYSTEM

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of the Invention

The present invention relates to a moving fluid energy recovery system for use in connection with generating electricity through rotational motion produced by moving fluid either by weather or a vehicle in motion.

2. Description of the Prior Art

Moving fluid energy recovery systems are desirable for transferring kinetic energy of a moving fluid to rotational motion for driving an electric generator or alternator. It can be appreciated that a fluid energy recovery system that is inexpensive and simple to manufacture is very beneficial to the production of electricity. These systems can be easily purchased, installed and maintained by the average person.

The ever increasing price of oil and gasoline, and the increasing global demand for electricity, in concert with the lack of natural resources to keep up with growing demand, has provided new impetus to look toward the development of alternative and renewable energy sources.

The use of fluid driven rotors or vehicle mounted wind powered electric generators are known in the prior art. Some of these known devices are complex and difficult to manufacture. While these systems and devices fulfill their respective, particular objectives and requirements, the aforementioned patents do not describe a moving fluid energy recovery system that allows generating electricity through rotational motion produced by moving fluid. But these, and similar, efforts have not been successful in overcoming the problems associated with the prior known wind or water machines. As a consequence, wind or water machines have not been commercially attractive and have not achieved substantial acceptance in the marketplace.

The windmill construction which has been most commonly utilized for the generation of electricity is a plural-bladed propeller positioned vertically for rotation about a horizontal axis. This type of construction has been widely used because, when positioned into the wind, the entire surface of each blade of the propeller is exposed to the full force of the moving air. The commercial windmill industry has developed around the horizontal-axis construction and the aerodynamic principles and knowledge discovered in connection with atmospheric flight. Accordingly, it has become common practice to design such machines for the atmospheric/wind conditions of specific locations by varying the number and/or dimensions of the blades employed. The fewer the propeller blades, the more efficient the machines become at high wind speeds but the less efficient they are at lower wind speeds. Furthermore, it is not practical to position the windmill on a moving vehicle.

Because the blades of horizontal-axis windmills are coupled indirectly to an electric generator which is effective only at a constant design speed, and because the blades themselves become unsafe at high speeds, the horizontal-axis windmills have been capable of utilizing only a small percentage of the theoretically-available power in the wind. The multi-blade windmills have high starting torque at low wind speeds, harvesting up to 30% of the kinetic energy from the wind but become very inefficient at high wind speeds. The most common and efficient windmills today are of the two and three blade types designed for high tip speed operation. These machines harvest roughly 42% of the theoretical 59.2% kinetic energy from the wind. Such windmills operate within a narrow window or range of wind velocities defined by a cut-in wind speed of 3-5 mps (meters/sec.) and a cut-out wind speed of about 25 mps. To maintain a near constant level of torque to drive the generator has required either: complex controls, in the case of pitch control, or intricate blade designs, in the case of stall control, both of which are expensive to build and maintain. In addition, such wind machines require yaw mechanisms with motors, gearboxes, cable twist counters, etc. to keep the machine yawed against the wind. These requirements have combined to make windmills economically unattractive except in areas where alternative forms of electricity generation are not readily available.

The windmill designs of the prior art also have other drawbacks. They have problems with gyroscopic vibration when the machine veers with changing wind direction. They are vulnerable to high bending moments at the base or root of the blades as each blade passes by or into the wind-shade of the supporting mast as well as when being braked during tempest conditions. These bending moments lead to frequent blade replacements and high maintenance costs. Because of their massive structures, these machines, of necessity, are remotely located miles from the area of power usage, thus necessitating construction of expensive power grids to transport the energy produced to the point of consumption, (generally large cities). Consequently, an approximate eight to ten percent of the power generated never reaches its destination due to line and transformer losses. Lastly, because of opposition from environmentalists with regard to the esthetics in natural settings as well as prohibition from municipal regulating authorities due to safety hazards associated with these large-prop machines in populated areas, many areas which would be ideal for generating wind energy, such as atop large buildings, are simply off-limits due to opposing design constraints.

Additionally, vehicle attached power generation devices are also known in the prior art. These devices typically use a variation of a squirrel-cage system to replace the windmill. The rotating cage of these devices uses movable deflectors to guide the wind into the cage where a single set of arcuate blades drives a generator. These known systems are complex, with control systems and inefficient rotor designs, thereby not making them practical to be placed and integrated into a moving vehicle.

Therefore, a need exists for a new and improved moving fluid energy recovery system that can be used for generating electricity through rotational motion produced by moving fluid. In this regard, the present invention substantially fulfills this need. In this respect, the moving fluid energy recovery system according to the present invention substantially departs from the conventional concepts and designs of the prior art, and in doing so provides an apparatus primarily developed for the purpose of generating electricity through rotational motion produced by moving fluid.

SUMMARY OF THE INVENTION

In view of the foregoing disadvantages inherent in the known types of fluid driven rotors now present in the prior art, the present invention provides an improved moving fluid energy recovery system, and overcomes the above-mentioned disadvantages and drawbacks of the prior art. As such, the general purpose of the present invention, which will be described subsequently in greater detail, is to provide a new and improved moving fluid energy recovery system and method which has all the advantages of the prior art mentioned heretofore and many novel features that result in a moving fluid energy recovery system which is not anticipated, rendered obvious, suggested, or even implied by the prior art, either alone or in any combination thereof.

To attain this, the present invention essentially comprises first and second end plates, a plurality of elongated inner arcuate vanes, a plurality of elongated outer arcuate vanes, and a shaft to drive an electricity generating device. The inner and outer vanes each have a substantially curved profile featuring a curve side and an open side. The first and second end plates each have a central bore defined therethrough, a plurality of inner vane slots each shaped to receive a corresponding inner vane, and a plurality of outer vane slots each shaped to receive a corresponding outer vane. The inner vane slots are orientated with the curve side toward the central bore, and the outer vane slots are orientated with the open side toward the central bore with the free ends of adjacent inner vane slots positioned in the open side of the outer vane slots.

The outer vane slots are orientated radially so as to define a gap between adjacent outer vanes thereby allowing fluid flow to pass therebetween toward the open side of the inner vanes.

There has thus been outlined, rather broadly, the more important features of the invention in order that the detailed description thereof that follows may be better understood and in order that the present contribution to the art may be better appreciated.

The invention may also include a fluid shield extending the entire length of the outer vanes and configured to allow fluid flow to contact no more than one-third the cross-sectional surface area of the outer vanes. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved moving fluid energy recovery system that has all of the advantages of the prior art fluid driven rotors and none of the disadvantages.

It is another object of the present invention to provide a new and improved moving fluid energy recovery system that may be easily and efficiently manufactured and marketed.

An even further object of the present invention is to provide a new and improved moving fluid energy recovery system that has a low cost of manufacture with regard to both materials and labor, and which accordingly is then susceptible of low prices of sale to the consuming public, thereby making such moving fluid energy recovery system economically available to the buying public.

Still another object of the present invention is to provide a new moving fluid energy recovery system that provides in the apparatuses and methods of the prior art some of the advantages thereof, while simultaneously overcoming some of the disadvantages normally associated therewith.

Even still another object of the present invention is to provide a moving fluid energy recovery system for generating electricity through rotational motion produced by moving fluid. This allows for an efficient and inexpensive way to produce electricity while in a moving vehicle or if located in an area with a fluid flow.

Lastly, it is an object of the present invention to provide a new and improved method of making a moving fluid energy recovery system by marking an equilateral pentagon centered on each end plate, and then marking lines from the center to each pentagon side intersection point. Outlines of the inner vane are then marked on each end plate with a center of each outline positioned on each of the lines so that a curved side of each of outline is toward the center of each end plate. Then inner vane slots are cut from each inner vane outline on each end plate. Lines are then marked from the center of each end plate to the midway point of each pentagon side. Outlines of the outer vane are then marked on each end plate with a center of each outline positioned on each of the pentagon midway lines so that an open side of each of outline is toward the center of each end plate, with the adjacent ends of each inner vane slot being in the open end of each outer vane outline. Then outer vane slots are cut from each outer vane outline on each end plate. A bore is then drilled through the center of each end plate. Each of the inner and outer vanes is then inserted into their respective vane slot and the shaft is coupled to an electricity generating device.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings and particularly to FIGS. 1-11, a preferred embodiment of the moving fluid energy recovery system of the present invention is shown and generally designated by the reference numeral 10.

Figure 1:
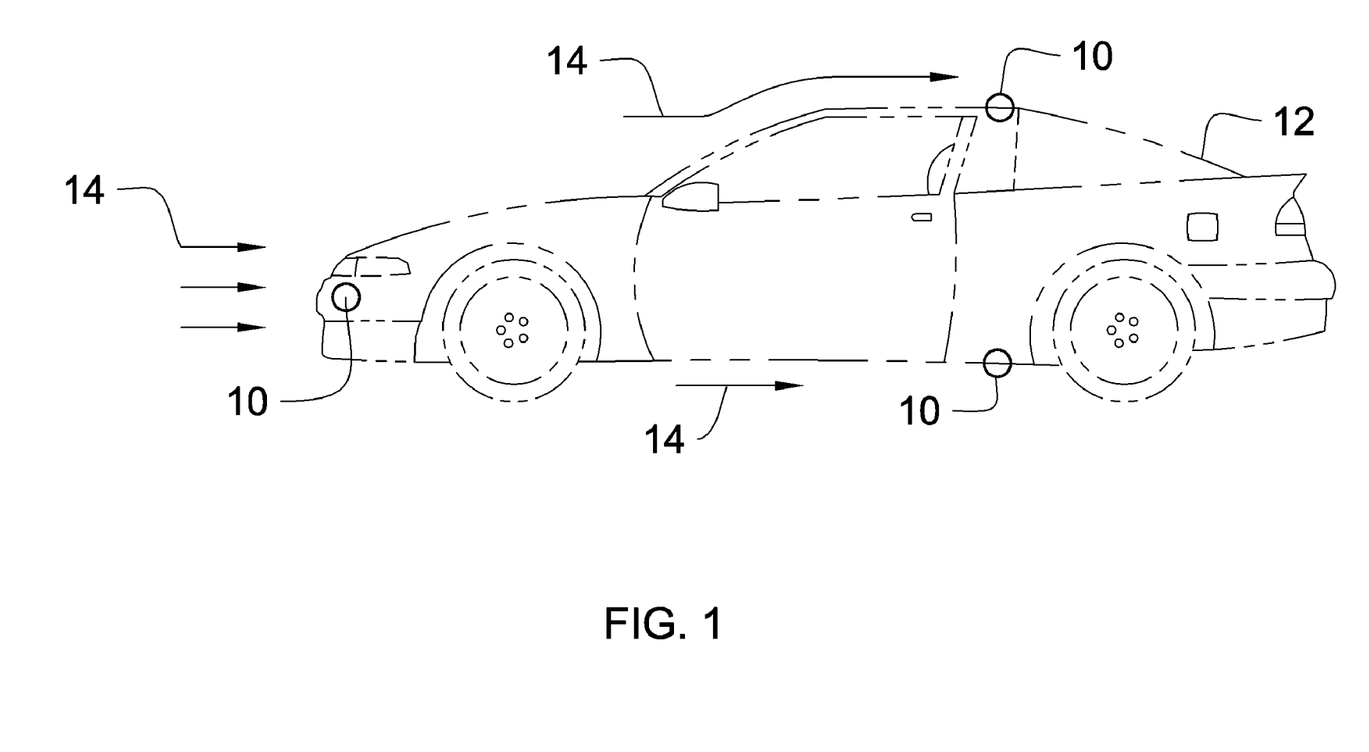
FIG. 1 is a side plane view of the preferred embodiment of the moving fluid energy recovery system constructed in accordance with the principles of the present invention, with the phantom lines depicting environmental structure and may not form part of the claimed invention.

In FIG. 1, a new and improved moving fluid energy recovery system 10 of the present invention for generating electricity through rotational motion produced by moving fluid 14 either by weather or a vehicle 12 in motion is illustrated and will be described. More particularly, the moving fluid energy recovery system 10 is a stand alone unit that is placed in the area of fluid flow 14 or can be removably attached to a moving vehicle 12 producing a fluid flow 14 when the vehicle is in motion. The fluid flow 14 can be any flowable fluid, such as but not limited to water, air, wind, liquids, slurries, dirt, and the like. The vehicle 12 can be any know traveling vehicle, such as but not limited to a motor vehicle, automobile, motorcycle, bicycle, aircraft, spacecraft, boat, submersible vehicle, and the like.

Figures 2, 3:
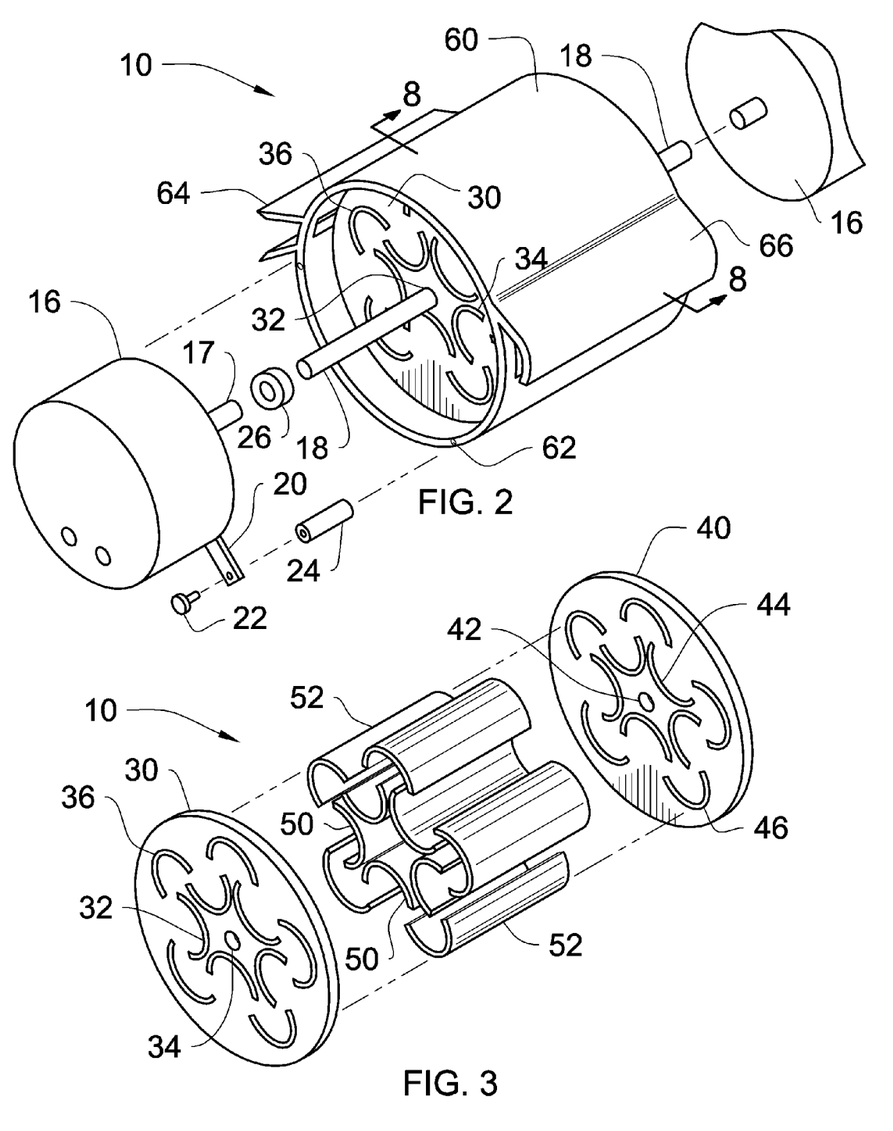
FIG. 2 is an exploded perspective view of the moving fluid energy recovery system in association with a power generating device of the present invention.
FIG. 3 is an exploded perspective view of the moving fluid energy recovery system of the present invention.

The moving fluid energy recovery system 10 is removably attachable to an electricity generating device 16 either directed or indirectly through a gear box or transmission (not shown), so as to provide rotational driving motion to the electricity generating device, as best illustrated in FIG. 2. The electricity generating device 16 can be any power generating device, such as but not limited to an alternator, and an electric generator. The electricity generating device 16 has a shaft 17, multiple brackets 20, and control and power connections (not shown) in communication with a control system, charging system, batteries, or motors.

As best illustrated in FIGS. 2 and 3, the moving fluid energy recovery system 10 has a shaft 18, a first end plate 30, a second end plate 40, a plurality of inner arcuate vanes 50, and a plurality of outer arcuate vanes 52. The shaft 18 can be connected to the shaft 17 of the electricity generating device 16 via a coupler 26. The shaft 18 can be a single shaft connected to the first end plate 30 and/or the second end plate 40, or the shaft 18 can be multiple shafts 18 each connected to and extending from a corresponding end plate 30, 40. An electricity generating device or alternator 16 can be attached to each shaft 18 thereby connecting a single moving fluid energy recovery system 10 to a pair of electricity generating devices 16 located adjacent to the first and second end plates 30, 40. The inner and outer vanes 50, 52 are located between the first and second end plates 30, 40 thereby creating a substantially cylindrical overall configuration. It can be appreciated that the shaft 17 of the electricity generating device 16 can be connected to the first and/or second end plates 30, 40 without the need of shaft 18. A fluid shield 60 can be attached to the electricity generating device 16 or to a stationary object and positioned exterior of the moving fluid energy recovery system 10 so as to only allow the fluid flow 14 to contact no more than one-third (⅓) the diameter of the moving fluid energy recovery system 10. The fluid shield 60 is attached to the brackets 20 of the electricity generating device 16 via fasteners 22 and spacers 24. The fasteners 22 engage with corresponding internally threaded mounting bores 62 in the fluid shield 60. The fluid shield 60 can be positioned to prevent the fluid flow 14 from contacting the bottom two-thirds (⅔) of the moving fluid energy recovery system 10, the top two-thirds (⅔) of the moving fluid energy recovery system 10, or can be divided into two section to shield the top one-third (⅓) and the bottom one-third (⅓) of the moving fluid energy recovery system 10. The fluid shield 60 has a tapered inlet 64, and an outlet 66. The tapered inlet 64 is angled in reference to the fluid flow 14, thereby directing the fluid flow upwardly or downwardly toward the inner and outer vanes 50, 52.

Figure 4:
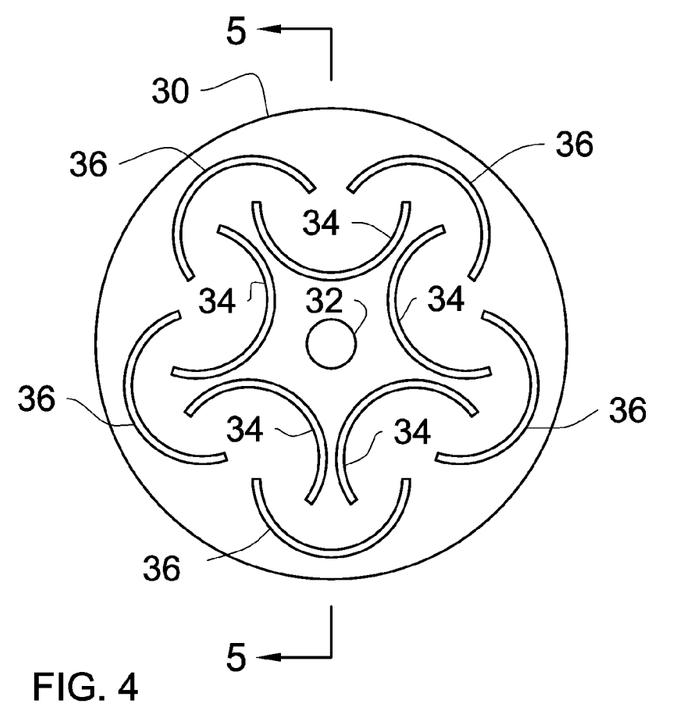
FIG. 4 is a side plane view of the end plate of moving fluid energy recovery system of the present invention.

The first end plate 30 is substantially cylindrical in shape with a centrally located bore 32, a plurality of inner vane slots 34, and a plurality of outer vane slots 36, as best illustrated in FIG. 4. The central bore 32 is adapted to receive the shaft 18 or the electricity generating device shaft 17. The present invention can have any number of inner vane slots 34 so as to produce a radial set of inner vane slots 34 with a minimum distance between adjacent vane slots. Preferably, the present invention has a total of five inner vane slots 34 sized to minimize any gaps between adjacent inner vane slots 34. Each of the inner vane slots 34 have a semi-circular or curved configuration corresponding to a cross-section profile of the inner vanes 50 featuring a curved and open side, and are radially positioned in the first end plate 30 with each curved side facing toward the center of the first end plate 30. Each inner vane slot 34 is in substantial juxtaposition with its adjacent inner vane slots on either side thereof.

Each of the outer vane slots 36 have a semi-circular or curved configuration corresponding to a cross-section profile of the outer vanes 52 featuring a curved and open side, and are radially positioned in the first end plate 30 with each open side facing toward the center of the first end plate 30. The present invention can have any number of outer vane slots 36 so as to produce a radial set of outer vane slots 36 with a gap 54 between adjacent outer vane slots sized to allow a portion of the fluid flow 14 to pass therethrough. Preferably, the present invention has a total of five outer vane slots 36 sized to produce gap 54 between adjacent outer vane slots 36. Each outer vane slot 36 is in substantial juxtaposition with its adjacent outer vane slots on either side thereof. The ends of adjacent inner vane slots 34 are located in the open side of a corresponding outer vane slot 36, thereby creating an offset configuration between the inner vane slots 34 and the outer vane slots 36.

The second end plate 40 is substantially identical to the first end plate 30, and is cylindrical in shape with a centrally located bore 42, a plurality of inner vane slots 44, and a plurality of outer vane slots 46. The central bore 42 is adapted to receive the shaft 18 or the electricity generating device shaft 17. The present invention can have any number of inner vane slots 44 so as to produce a radial set of inner vane slots 44 with a minimum distance between adjacent vane slots. Preferably, the present invention has a total of five inner vane slots 44 sized to minimize any gaps between adjacent inner vane slots 44. Each of the inner vane slots 44 have a semi-circular or curved configuration corresponding to a cross-section profile of the inner vanes 50 featuring a curved and open side, and are radially positioned in the second end plate 40 with each curved side facing toward the center of the second end plate 40. Each inner vane slot 44 is in substantial juxtaposition with its adjacent inner vane slots on either side thereof.

Each of the outer vane slots 46 have a semi-circular or curved configuration corresponding to a cross-section profile of the outer vanes 52 featuring a curved and open side, and are radially positioned in the second end plate 40 with each open side facing toward the center of the second end plate 40. The present invention can have any number of outer vane slots 46 so as to produce a radial set of outer vane slots 46 with a gap 54 between adjacent vane slots sized to allow a portion of the fluid flow 14 to pass therethrough. Preferably, the present invention has a total of five outer vane slots 46 sized to produce the gap 54 between adjacent outer vane slots 46. Each outer vane slot 46 is in substantial juxtaposition with its adjacent outer vane slots on either side thereof. The ends of adjacent inner vane slots 44 are located in the open side of a corresponding outer vane slot 46, thereby creating an offset configuration between the inner vane slots 44 and the outer vane slots 46.

The inner and outer vanes 50, 52 are each elongated vanes or foils having a substantially semi-circular or curve configuration which corresponds to the configuration of the inner and outer vane slots 34, 36, 44, 46. Each inner and outer vane 50, 52 include free ends, a curve side, an open side, and longitudinal side edges. The inner vanes 50 are each received in a corresponding inner vane slot 34, 44 of the first and second end plates 30, 40 respectively. The outer vanes 52 are each received in a corresponding outer vane slot 36, 46 of the first and second end plates 30, 40 respectively, as best illustrated in FIG. 3

Additional moving fluid energy recovery systems 10 can be connected in series or in parallel via a gear box/transmission (not shown) to produce a more powerful system. Furthermore, additional sets of inner and outer vanes 50, 52 can be connected to the second end plate 40 opposite the first set of inner and outer vanes 50, 52 to create an extended moving fluid energy recovery system 10. The first end plate of the additional moving fluid energy recovery system can be attached to the second end plate of the adjacent moving fluid energy recovery system. It can also be appreciated that the additional moving fluid energy recovery system lack the first end plate with the free ends of the additional sets inner and out vanes can be inserted into corresponding inner and outer vane slots of the second end plate of the adjacent moving fluid energy recovery system.

Figure 5:
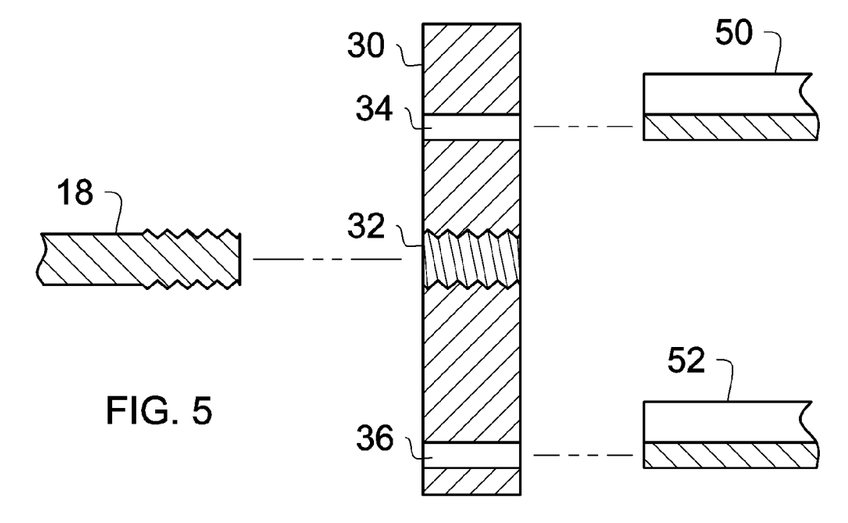
FIG. 5 is a cross-sectional view of the end plate, power generator shaft, and vanes of the moving fluid energy recovery system of the present invention, taken along line 5-5 in FIG. 4.

FIG. 5 illustrates the first end plate 30, but the following description additionally applies to the second end plate 40 (not shown). The inner and outer vane slots 34, 36 of the first end plate 30 run through their respective plats and are sized and configured to securely receive and retain their corresponding inner and outer vanes 50, 52. The inner and outer vanes 50, 52 are inserted into their respective vane slots and then fixed therein by friction, glue, clamps, or are welded into place. The central bore 32 has an internal thread adapted to receive a threaded end of either shaft 18 or shaft 17 of the electricity generating device 16.

Figure 6:
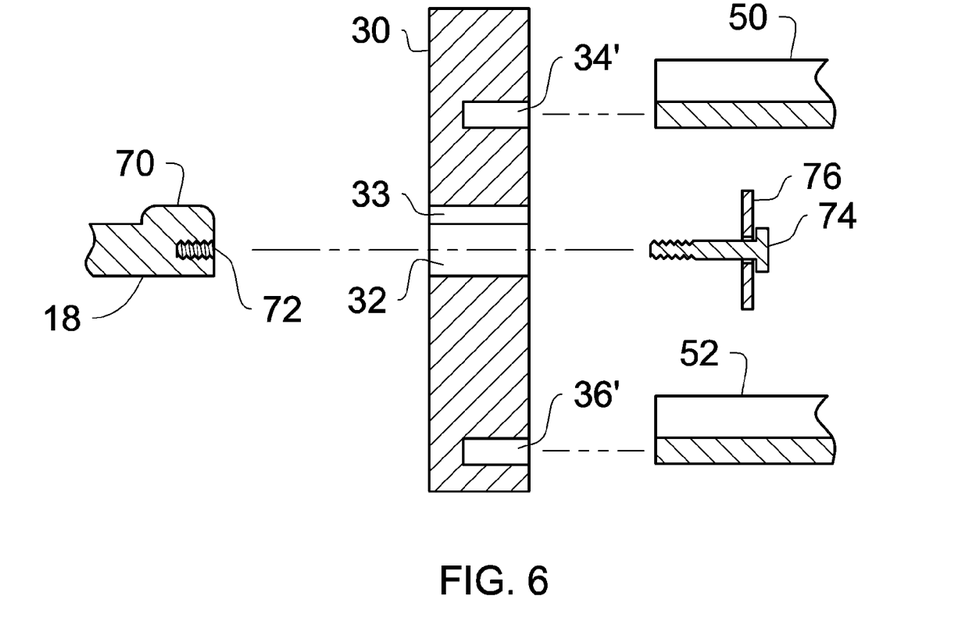
FIG. 6 is a cross-sectional view of an alternate embodiment of the end plate, power generator shaft, and vanes of the view of the moving fluid energy recovery system of the present invention.

FIG. 6 illustrates an alternate embodiment of the first end plate 30 and shaft 18, with the following description additionally applying to the second end plate 40 (not shown). The inner and outer vane slots 34', 36' of the first end plate 30 extend partially into their respective end plates to produce recesses that are sized and configured to securely receive and retain their corresponding inner and outer vanes 50, 52. The inner and outer vane slots 34', 36' do not run through their respective end plates, but are configured to form a pocket or recess configured to receive a corresponding vane. The inner and outer vanes 50, 52 are inserted into their respective vane slots and then fixed therein by friction, glue, clamps, or welding. The central bore 32 has a longitudinal slot 33 adjacent and in communication with the central bore 32.

The shaft 17, 18 has a key 70 adjacent the free end of the shaft, and a threaded longitudinal bore 72 defined in the free end of the shaft. The shaft 17, 18 is inserted into the central bore 32 with key 70 receivable within the slot 33 of the central bore. A fastener 74 with a washer 76 is secured to the threaded bore 72 of the shaft 17, 18, thereby fixing the shaft 17, 18 to the first or second end plates 30, 40. The key 70 and slot 33 assembly allows for all rotational movement of the end plates 30, 40 to be transferred to the shaft 17, 18, thereby driving the electricity generating device 16.

Figure 7:
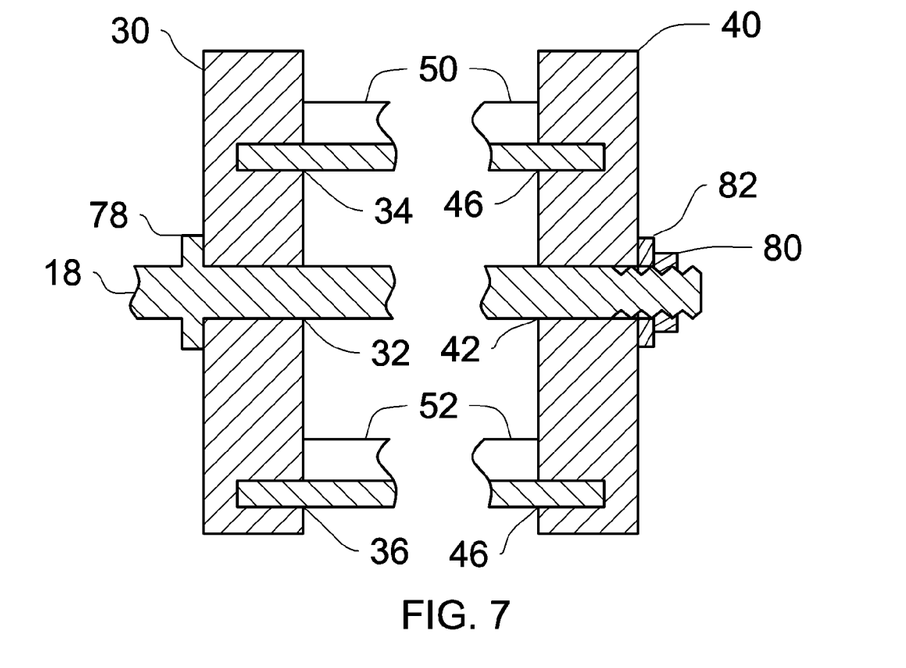
FIG. 7 is a cross-sectional view of an alternate embodiment of the end plate, power generator shaft, and vanes of the view of the moving fluid energy recovery system of the present invention.

FIG. 7 illustrates an alternate embodiment of the shaft 18. The inner and outer vane slots 34', 36', 44', 46' of the first and second end plates 30, 40 extend partially into their respective plates and are sized and configured to securely receive and retain their corresponding inner and outer vanes 50, 52. The inner and outer vane slots 34', 36', 44', 46' do not run through their respective end plates, but are configured to form a pocket configured to receive a corresponding vane. The central bore 32 is a smooth bore sized to receive the shaft 18 or the shaft 17 of the electricity generating device 16 therethrough. The shafts 17, 18 have a stop 78 with a diameter greater than the shaft 17, 18, and a threaded end opposite of the stop 78. A nut 80 is configured to be threadably secured to the threaded end of shaft 17, 18. A washer is sized to receive the shaft 17, 18 therethrough and to have a diameter larger than the nut 80. The inner and outer vanes 50, 52 are inserted into their respective vane slots and then clamped between the first and second end plates 30, 40 when nut 80 is tightened on the thread end of shaft 18, thereby applying pressure to the washer 82. Washer 82 transfers the pressure to the second end plate 40, the inner and outer vanes 50, 52 and the first end plate 30. The first end plate is pressed against the stop 78 thereby squeezing the first and second end plates 30, 40 together and securing the inner and outer vanes 50, 52 in their respective inner and outer vanes slot 34', 36', 44', 46. With the nut 80 clamping the first and second end plates 30, 40 to the stop 78 of the shaft 17, 18, then all rotational motion of the inner and outer vanes 50, 52 are then transferred to the shaft 17, 18, thereby driving the electricity generating device 16.

Figure 8:
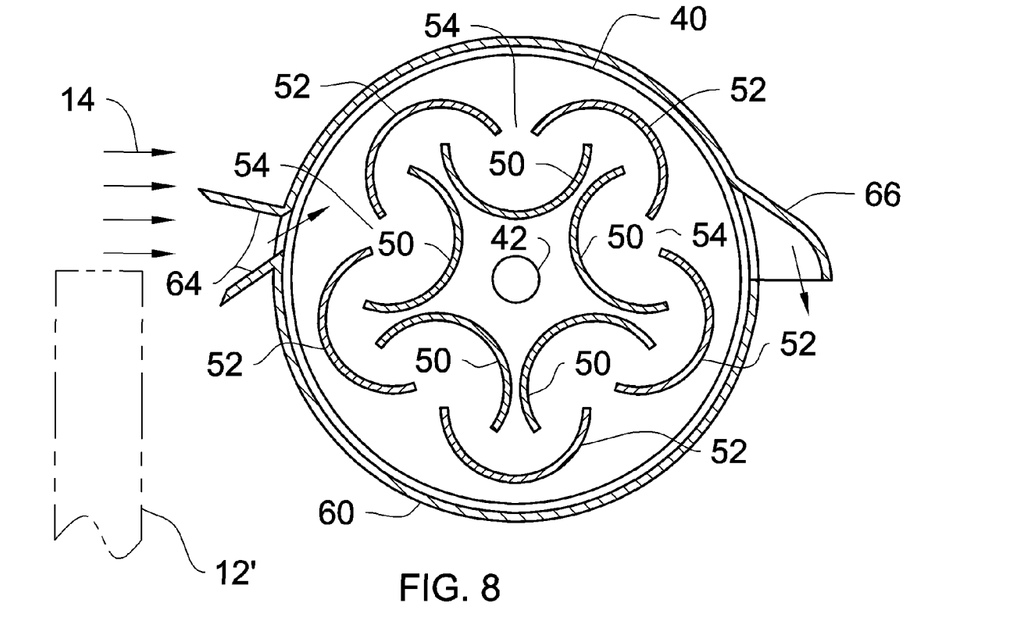
FIG. 8 is a cross-sectional view of the moving fluid energy recovery system of the present invention, taken along line 8-8 in FIG. 2.

FIG. 8 illustrates an assembled moving fluid energy recovery system 10 in reference to the fluid flow 14. A portion of the fluid flow 14 travels toward the moving fluid energy recovery system 10 due to the fact that some of the fluid flow 14 is prevented from contacting the moving fluid energy recovery system 10 by either a portion 12' of the vehicle 12, or by the fluid shield 60. The fluid flow 14 contacts the inner and outer vanes 50, 52 perpendicularly to or at an angle to the longitudinal axis of the moving fluid energy recovery system 10 due to the angle of the tapered inlet 64 of the shield 60, thereby creating a rotational moment on the shaft 17, 18. The tapered inlet 64 of the shield 60 has a funnel-like configuration which increases the velocity of the fluid flow 14 entering the moving fluid energy recovery system 10, and angles the fluid flow 14 so that it initially contacts the inner and outer vanes 50, 52 at an angle, thereby causing a rotational moment. The fluid flow 14 exiting the inner and outer vanes 50, 52 exhaust out the outlet 66, which can be angled to divert the exhausted fluid flow. The tapered inlet 64 and the outlet 66 each have a corresponding opening in the shield 60 so as to allow the fluid flow 14 to either enter or exit the moving fluid energy recovery system 10. FIG. 8 also illustrates the offset configuration of the outer and inner vanes 50, 52, with the free ends of adjacent inner vanes 50 located within the interior of the open side of a corresponding outer vane 52. Additionally, the gap 54 defined between adjacent outer vanes 52 is clearly shown.

Figure 9A:
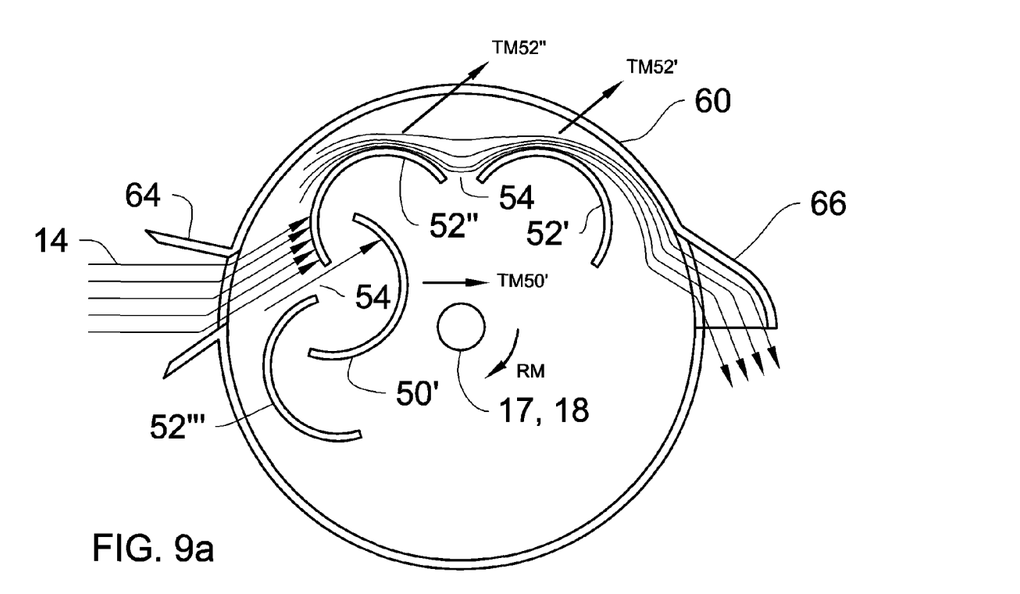
FIGS. 9a-c are graphic representations showing the torque moment created in relation to fluid flow around the vanes of the moving fluid energy recovery system of the present invention for 90 degrees of rotation.
Figure 9B:
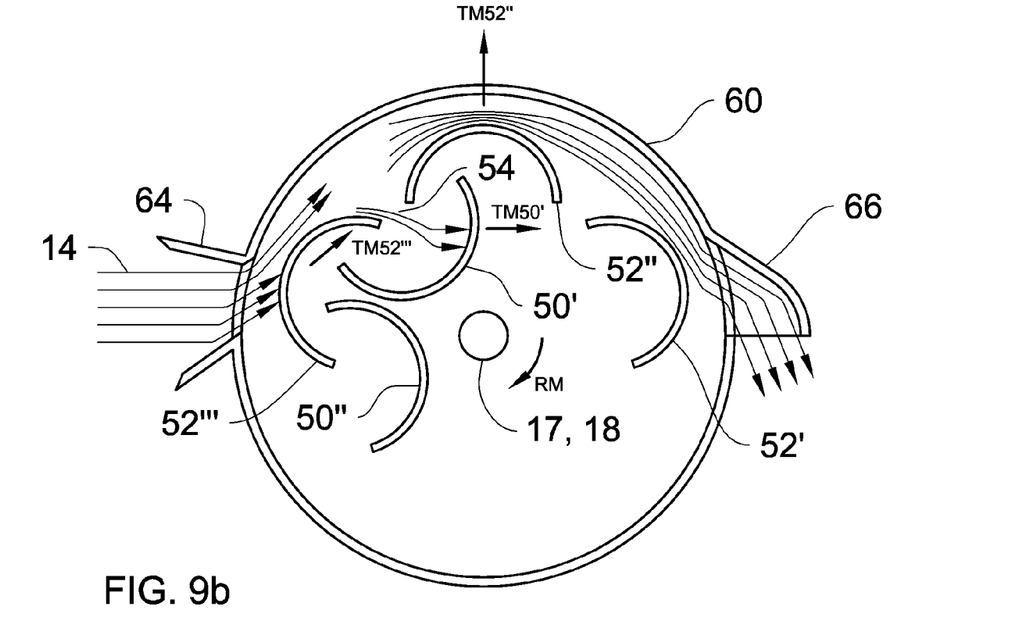
Figure 9C:
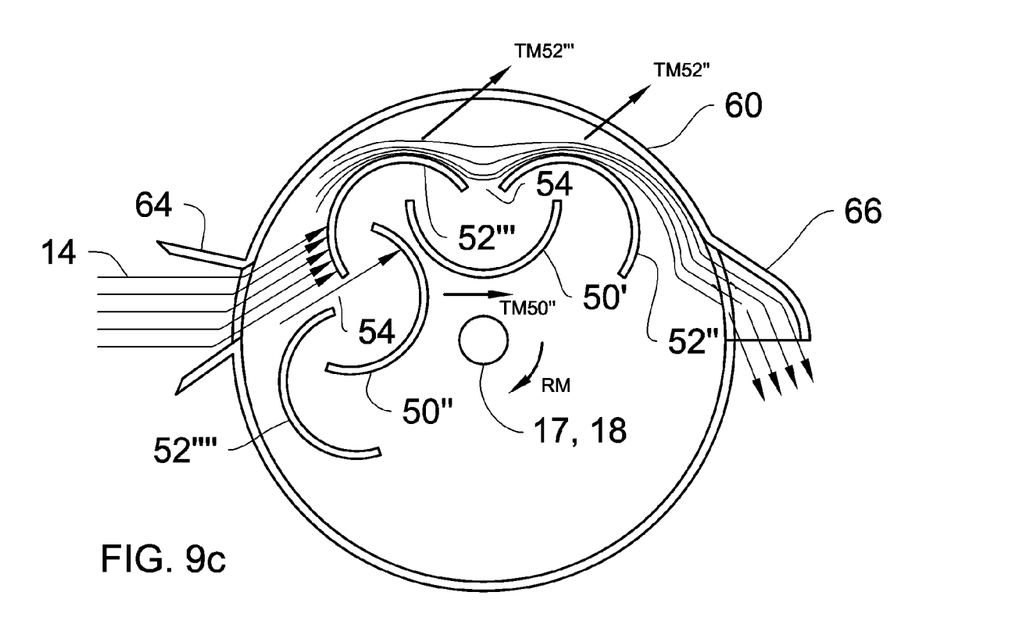

The graphical representation of FIGS. 9a-c depicts the direction of the fluid flow, as indicated by the lined arrows 14, as it flows around a set of inner and outer vanes 50, 52. It also depicts the direction of torque moment TM and rotational moment RM created though 90 degrees of rotation cycle in an open-fluid circuit, with the influence of the vehicle portion 12' or the shield 60 as shown in FIG. 8. For clarification and simplicity, the inner and outer vanes that contribute to the rotational moment RM will only be shown and described and are labeled as 50', 50'', 52', 52'', 52''', 52'''' hereinafter. It is appreciated by one skilled in the art that any number of inner and outer vanes can be used in the described and illustrated configuration.

FIG. 9a graphically illustrates a representative starting point of rotation for the moving fluid energy recovery system 10. A portion of the fluid flow 14 passes by the vehicle portion 12' or the shield 60 through the angled tapered inlet 64 and contacts the curved side of the outer vane 52'' with a portion of the fluid flow passing through the gap 54 between adjacent outer vanes 52'', 52'''. The fluid flow portion passing through the gap 54 then contacts the interior of the open side of inner vane 50' thereby creating a torque moment TM50' substantially parallel with the fluid flow 14 but above the shaft 17, 18. Since the torque moment TM50' of inner vane 50' is offset from the longitudinal axis of the shaft 17, 18 then a rotational moment RM is produced. This rotational moment RM is further validated by the equation $I=mr^2$, where I is the moment of inertia RM, m is the mass or force of fluid flow 14, and r is the radius or distance of the fluid flow force 14 from the shaft 17, 18.

Another portion of the fluid flow 14 travels along the curved side of the outer vane 52'', which in this configuration acts like an airfoil. The pressure of the fluid flow 14 on the curved side of the outer vane 52'' is less than that of the fluid flow in the open side of the outer vane 52'' thereby creating a torque moment TM52''. Torque moment TM52'' is displaced at an angle with the fluid flow 14 because of the angular position of the outer vane 52''. Since the torque moment TM52'' of outer vane 52'' is offset and angled from the longitudinal axis of the shaft 17, 18, due to the lift force (torque moment) component of the aerodynamic force of the outer vane 52'' which is perpendicular to the fluid flow 14, then an additional rotational moment RM is produced. This rotational moment is added to the rotational moment created by inner vane 50'. The torque moment TM52'' is validated by Newton's Third Law of action and reaction, and Bernoulli's principle which can be derived from Newton's second law and conservation of mass.

The portion of fluid flow 14 exiting the outer vane 52'' then travels past the gap 54 between adjacent outer vanes 52', 52'' and then along the curved side of the outer vane 52', which in this configuration acts like an airfoil. The pressure of the fluid flow 14 on the curved side of the outer vane 52' is less than that of the fluid flow in the open side of the outer vane 52' thereby creating a torque moment TM52'. Torque moment TM52' is displaced at an angle with the fluid flow 14 because of the angular position of the outer vane 52'. Since the torque moment TM52' of outer vane 52' is offset and angled from the longitudinal axis of the shaft 17, 18 then an additional rotational moment RM is produced. This rotational moment is added to the rotational moment created by inner vane 50' and outer vane 52'' thereby creating a total rotational moment RM on the shaft 17, 18 which drives the electricity generating device 16. All exhausted fluid flow exits the moving fluid energy recovery system 10 through outlet 66.

FIG. 9b graphically illustrates a representative second point of rotate for the moving fluid energy recovery system 10 at a 45 degree rotation cycle from the first point of rotation in FIG. 9a. The previously-described rotational moment RM has rotated all the outer and inner vanes in a direction with the fluid flow 14. Outer vane 52' has rotated into a position downstream of the vehicle portion 12' or the shield 60, and is therefore no longer affected by the fluid flow 14. In this position the angled fluid flow 14 contacts the outer vane 52''' and travels along its curved side with a portion of the fluid flow then passing through the gap 54 between adjacent outer vanes 52'', 52''' and the remaining fluid flow traveling toward outer vane 52''. The fluid flow portion traveling through gap 54 then contacts the interior of the open side of inner vane 50' thereby creating a torque moment TM50' substantially parallel with the fluid flow 14 but above the shaft 17, 18. Since the torque moment TM50' of inner vane 50' is offset from the longitudinal axis of the shaft 17, 18 then a rotational moment RM is produced, as above-described.

The portion of the fluid 14 not traveling through gap 54 then contacts outer vane 52''' and travels along its curved side, which in this configuration acts like an airfoil, and produces a torque moment TM52'''. Torque moment TM52''' is displaced at an angle with the fluid flow 14 because of the angular position of the outer vane 52'''. Since the torque moment TM52''' of outer vane 52''' is offset and angled from the longitudinal axis of the shaft 17, 18 then an additional rotational moment RM is produced. This rotational moment is added to the rotational moment created by inner vane 50'.

Any portion of fluid flow 14 not affected by outer vane 52''' contacts outer vane 52'' and travels along its curved side, which in this configuration acts like an airfoil, thereby created a torque moment TM52''. Torque moment TM52'' is now displaced upwardly due to aerodynamic principles, but is negated by the combined torque moments TM52''', TM50'. Since the torque moments of outer vane 52''' and inner vane 50' are greater than the torque moment of outer vane 52'', then there is a total rotational moment RM on the shaft 17, 18 which drives the electricity generating device 16. All exhausted fluid flow exits the moving fluid energy recovery system 10 through outlet 66.

FIG. 9c graphically illustrates a representative third point of rotation for the moving fluid energy recovery system 10 at a 45 degree rotation cycle from the second point of rotation in FIG. 9b. The previously-described rotational moment RM has rotated all the outer and inner vanes in a direction with the fluid flow 14. Outer vane 52'' has rotated into the position of outer vane 52' and outer vane 52''' has rotated into the position of outer vane 52'' from FIG. 9*a*. A portion of the fluid flow 14 passes by the vehicle portion 12' or the shield 60 through the angled tapered inlet 64 and contacts the curved side of the outer vane 52''' with a portion of the fluid flow passing through the gap 54 between adjacent outer vanes 52''', 52''''. The fluid flow portion that passes through the gap 54 then contacts the interior of the open side of inner vane 50'' thereby creating a torque moment TM50'' substantially parallel with the fluid flow 14 but above the shaft 17, 18. Since the torque moment TM50'' of inner vane 50'' is offset from the longitudinal axis of the shaft 17, 18 then a rotational moment RM is produced.

Another portion of the fluid 14 travels along the curved side of the outer vane 52''', which in this configuration acts like an airfoil, thereby creating a torque moment TM52'''. Torque moment TM52''' is displaced at an angle with the fluid flow 14 because of the angular position of the outer vane 52'''. Since the torque moment TM52''' of outer vane 52''' is offset and angled from the longitudinal axis of the shaft 17, 18 then an additional rotational moment RM is produced. This rotational moment is added to the rotational moment created by inner vane 50''.

The portion of fluid flow 14 exiting the outer vane 52'' then travels along the curved side of the adjacent outer vane 52'', which in this configuration acts like an airfoil, thereby created a torque moment TM52''. Torque moment TM52'' is displaced at an angle with the fluid flow 14 because of the angular position of the outer vane 52''. Since the torque moment TM52'' of outer vane 52'' is offset and angled from the longitudinal axis of the shaft 17, 18 then an additional rotational moment RM is produced. This rotational moment is added to the rotational moment created by inner vane 50'' and outer vane 52''' thereby creating a total rotational moment 1M on the shaft 17, 18 which drives the electricity generating device 16. All exhausted fluid flow exits the moving fluid energy recovery system 10 through outlet 66.

The graphical representation of FIGS. 10*a-g* depicts one possible method of making the moving fluid energy recovery system 10, with focus on the first end plate 30 since all additional end plates would be made in an identical process. All hidden or dashed lines in FIGS. 10*a-g* represent markings or drawn lines for the manufacture of the end plates.

Figure 10A:
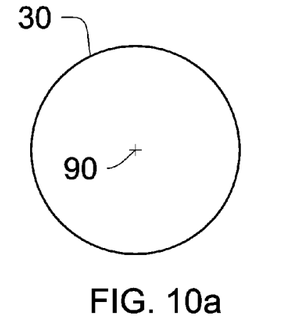
FIGS. 10a-g are side plane views showing the method of making the end plates of the moving fluid energy recovery system of the present invention.
Figure 10B:
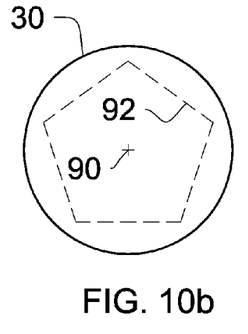
Figure 10C:
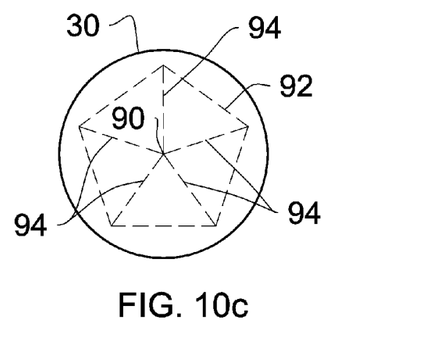

End plate 30 is cut or machined into a circular configuration having a predetermined diameter. The center 90 of the each end plate 30 is marked as a reference point and guide for future use, as shown in FIG. 10*a*. An equilateral pentagon 92 is drawn or marked on the end plate 30 with the center of the pentagon being the center 90, as shown in FIG. 10*b*. All the sides of the pentagon 92 are equal in length. Intersection lines 94 are marked from the center 90 to each intersection point of the sides of the pentagon 92, as shown in FIG. 10*c*. The lines 94 will produce triangles between the center 90 and each side of the pentagon 92. The triangles will make a track for each of the inner vane slots in a back-to-back configuration around the center 90.

Figure 10D:
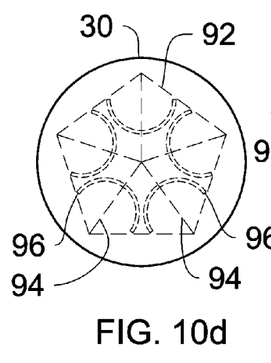

Each inner vane or a cross-sectional template thereof is placed on the end plate 30 in a back-to-back configuration around the center 90 with the curved side of each vane facing toward the center 90 so that the midway point of each vane lies on an intersection line 94, as shown in FIG. 10*d*. An outline 96 of each inner vane is marked on the end plate 30 and then the inner vane or template is removed. Using the outlines 96 as a guide, each inner vane slot 34 is cut or machined from the end plate 30, as shown in FIG. 10*g*. Each inner vane slot 34 can be either cut out completely through the end plate 30 or can be machined to produce a pocket in the end plate 30.

After the inner vane slots 34 are produced, midway lines 98 are marked from the center 90 to the midway point of each side of the pentagon 92 and between each adjacent inner vane slot 34. Each midway line 98 is extended to the edge of the end plate 30 to guide the placement of each outer vane or an outer vane template, as shown in FIG. 10*e*.

Figures 10E, 10F:
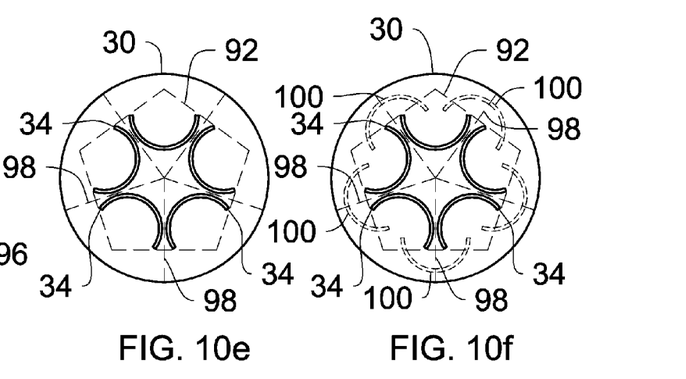
Figure 10G:
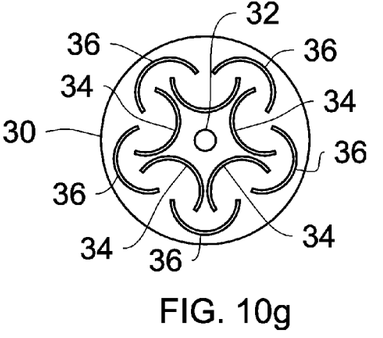

After each midway line 98 is marked, each outer vane or a cross-sectional template thereof is placed in a back-to-back configuration around the center 90 with the open side of each vane facing toward the center 90 so that the midway point of each outer vane lies on a corresponding midway line 98, as shown in FIG. 10*f*. The midway point of each outer vane is positioned on their respective midway line 98 so that the ends of adjacent corresponding inner vane slots 34 are received in the interior of the open side of each outer vane. After each outer vane is positioned on a midway line 98, an outline 100 of each outer vane is marked on the end plate 30 and then the outer vanes or templates are removed. Using the outlines 100 as a guide, each outer vane slot 36 is cut or machined out and a hole or bore 32 is drilled at center 90 from the end plate 30, as shown in FIG. 10*g*. Each outer vane slot 36 can be either cut out completely through the end plate 30 or can be machined to produce a pocket in the end plate 30. The bore 32 is sized to receive the shaft therethrough or is machined to have internal threads configured to engage the threaded end of shaft. It can also be appreciated that the first end plate can be manufactured with the bore 32 sized to receive the shaft therethrough, and the bore of any subsequent end plates being machined with internal threads.

Figure 11:
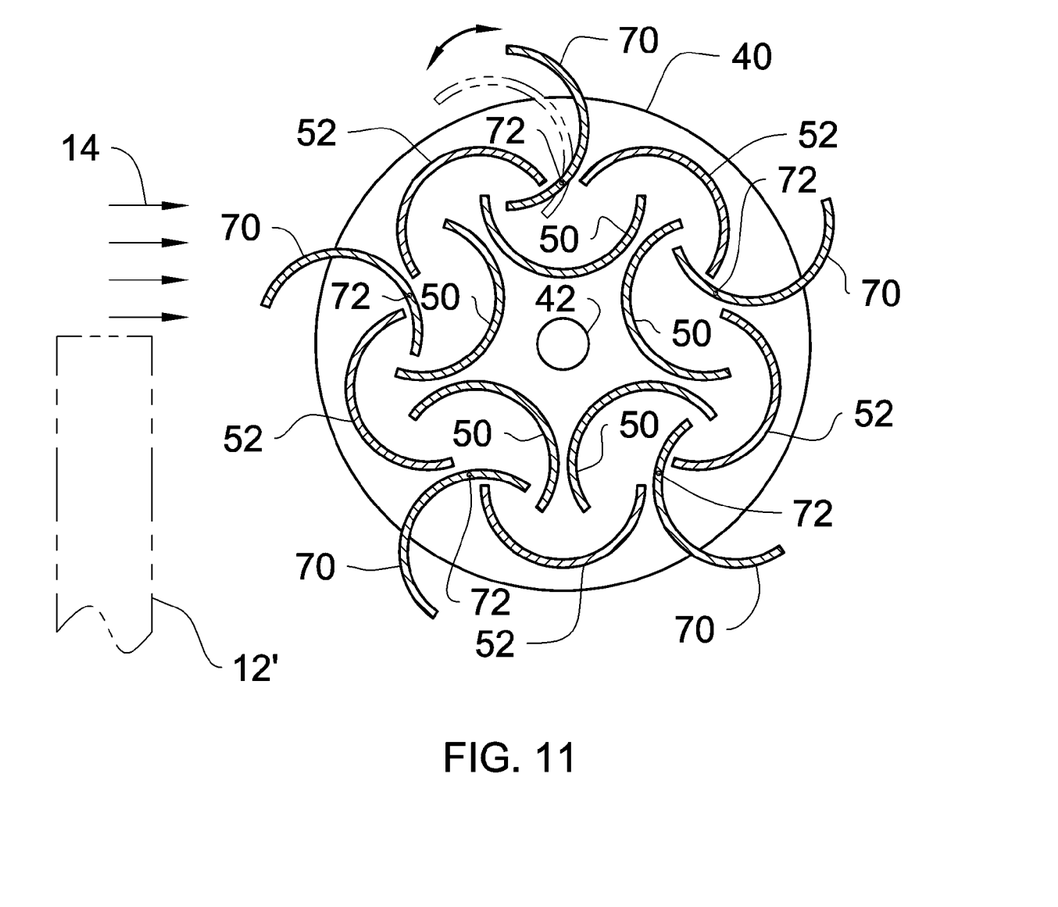
FIG. 11 is a cross-sectional view of an alternate embodiment of the moving fluid energy recovery system of the present invention.

FIG. 11 illustrates an alternate embodiment of the moving fluid energy recovery system 10. The fluid flow 14 travels toward the moving fluid energy recovery system or a portion of the fluid flow 14 thereof travels toward the present invention due to the fact that some of the fluid flow 14 is prevented from contacting the moving fluid energy recovery system by the portion 12' of the vehicle 12. The alternate embodiment moving fluid energy recovery system includes inner and outer vanes 50, 52, first and second end plates 30, 40, and a plurality of external vanes 70. Each external vane 70 has a substantial similar shape as the inner and outer vanes 50, 52, and features a curved side and an open side. The external vanes 70 are radially positioned around the shaft 18 and located between each gap 54. Each external vane 70 is orientated in its corresponding gap 54 so that a portion of its cross-sectional length extends out past an adjacent outer vane 52 and/or the edge of the first and second end plates 30, 40. Each external vane 70 is fixed to the first and second end platens 30, 40 via a connector 72. The connectors 72 can be, but not limited to, a fastener, shaft, rod, post, pin, dowel or the like. The connectors 72 allow each external vane 70 to be pivotably adjusted so that the angle at which each external vane 70 contacts the fluid flow 14 can be adjusted. The fluid flow 14 contacts the external vanes 70 first and then contacts the inner and outer vanes 50, 52 perpendicularly to or at an angle to the longitudinal axis of the moving fluid energy recovery system, thereby creating a rotational moment on the shaft 17, 18. The moving fluid energy recovery system is positioned so that the open side of each external vane 70 is positioned toward the fluid flow 14, thereby producing additional rotational moment without the need of the shield.

To assemble the moving fluid energy recovery system, an inner vane is inserted into each formed inner vane slot of the end plates, and an outer vane is inserted into each formed outer vane slot of the end plates. Each inner and outer vane is press fitted, glued, clamped, or welded into their corresponding vane slot. The shaft is inserted through or secured to one or both of the end plates. The shaft is then connected to the shaft of the electricity generating device or alternator via the coupler or couplers. The shield, if one is being used, is then secured to mounts on the electricity generating device or a stationary object. The moving fluid energy recovery system is then positioned in the fluid flow or attached to a moving vehicle so that the inner and outer vanes are positioned in the fluid flow produced by the motion of the vehicle. It can be appreciated that the first and/or second end plates can be directly attached to the shaft of the electricity generating device without the need of the moving fluid energy recovery system shaft. Additionally, multiple electricity generating devices can be driven by a single moving fluid energy recovery system by connecting each electricity generating device to the shaft or shafts extending outer therefrom.

In operation, the fluid flow will contact no more than one-third of the diameter of the moving fluid energy recovery system due to the shield or the portion of the vehicle blocking the fluid flow. The fluid flow contacting or traveling along the inner and outer vanes produce torque moments on each acting vane. The end plates and the inner and outer vanes are rotated due to the torque moments produced by the fluid flow. Each torque moment is translated into a rotation moment on the shaft which drives the electricity generating device. The electricity generating device produces electricity to a load attached thereto. The load can be, but not limited to, a battery charging system, a power grid, an electric motor, and any electrically powered device. The electricity produced from generating device can be either DC or AC, depending on the type of generating device or if an inverter is used.

While a preferred embodiment of the moving fluid energy recovery system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, composite, or a variety of alloys may be used in the manufacture of the present invention. And although generating electricity through rotational motion produced by moving fluid either by weather or a vehicle in motion has been described, it should be appreciated that the moving fluid energy recovery system herein described is also suitable for providing mechanical rotational power to any device or system from any fluid flow.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A moving fluid energy recovery system for generating electricity through rotational motion produced by a fluid flow, said moving fluid energy recovery system comprising:
   at least one elongated inner vane having a substantially curved profile featuring a curve side, and an open side;
   at least one elongated outer vane having a substantially curved profile featuring a curve side, and an open side;
   a first and second end plate each having a central bore defined therethrough, at least one inner vane slot, and at least one outer vane slot, said inner vane slot of said first and second end plates being configured to receive said inner vane therebetween, said outer vane slot of said first and second end plates being configured to receive said outer vane therebetween, said inner vane slot being orientated with said curve side of said inner vane toward said central bore of said first and second end plates, said outer vane slot being orientated with said open side of said outer vane toward said central bore of said first and second end plates and with at least one longitudinal edge of said inner vane in an interior of said open side of said outer vane; and
   at least one shaft adapted to be received by said central bore of at least said first end plate.

2. The moving fluid energy recovery system as set forth in claim 1, wherein said inner and outer vane slots are a plurality of inner and outer vane slots located radially outward from said central bore of said first and second end plates respectively, and said inner and outer vanes are a plurality of inner and outer vanes.

3. The moving fluid energy recovery system as set forth in claim 2, wherein said plurality of outer vane slots are radially positioned to define a gap between adjacent outer vane slots allowing fluid flow to pass between said outer vanes toward said open side of said inner vanes.

4. The moving fluid energy recovery system as set forth in claim 3, wherein said inner and outer vane slots are defined through said first and second end plates respectively.

5. The moving fluid energy recovery system as set forth in claim 3, wherein said inner and outer vane slots are defined in said first and second end plates respectively producing recesses.

6. The moving fluid energy recovery system as set forth in claim 3, wherein said shaft includes a threaded end, and said central bore of said first end plate or said second end plate includes internal threads adapted to engage with said threaded end of said shaft.

7. The moving fluid energy recovery system as set forth in claim 3, wherein said shaft includes a key adjacent a free end and a threaded bore defined in said free end, and wherein said central bore of said first end plate includes a slot in communication with said central bore and adapted to receive said key of said shaft.

8. The moving fluid energy recovery system as set forth in claim 3, wherein said shaft includes a stop and a threaded end, said first end being positionable on said shaft until said first end contacts said stop, and wherein said shaft further comprising a nut engagable with said threaded end of said shaft for contacting said second end plate and clamping said first and second end plates between said stop and said nut when tightened.

9. The moving fluid energy recovery system as set forth in claim 2 further comprising an electricity generating device attachable to said shaft.

10. The moving fluid energy recovery system as set forth in claim 9 further comprising a fluid shield attachable to said electricity generating device and configured to enclose a portion of said inner and outer vanes, said fluid shield being stationary in relation to said inner and outer vanes, said fluid shield having a tapering inlet angle in relation to the fluid flow, and an outlet located opposite of said tapering inlet.

11. A moving fluid energy recovery system comprising:
   a plurality of elongated inner vanes each having a substantially curved profile featuring a curve side, and an open side;

a plurality of elongated outer vanes each having a substantially curved profile featuring a curve side, and an open side;

a first and second end plate each having a central bore defined therethrough, a plurality of inner vane slots, and a plurality of outer vane slots, said inner vane slots of said first and second end plates being configured to receive a corresponding said inner vane therebetween, said outer vane slots of said first and second end plates being configured to receive a corresponding said outer vane therebetween, said inner vane slots being radially orientated with said curve sides of said inner vanes toward said central bore of said first and second end plates, said outer vane slots being radially orientated with said open sides of said outer vanes toward said central bore of said first and second end plates and with adjacent edges of said inner vanes positioned in an interior of said open sides of said outer vanes respectively; and at least one shaft adapted to be received by said central bore of at least said first end plate;

wherein said outer vane slots being sized to define a gap between adjacent outer vanes thereby allowing fluid flow to pass therebetween toward said open side of said inner vanes.

12. The moving fluid energy recovery system as set forth in claim 11, wherein said inner and outer vane slots are defined through said first and second end plates respectively.

13. The moving fluid energy recovery system as set forth in claim 11, wherein said inner and outer vane slots are defined in said first and second end plates respectively producing recesses.

14. The moving fluid energy recovery system as set forth in claim 11, wherein said shaft includes a threaded end, and said central bore of said first end plate or said second end plate includes internal threads adapted to engage with said threaded end of said shaft.

15. The moving fluid energy recovery system as set forth in claim 11, wherein said shaft includes a key adjacent a free end and a threaded bore defined in said free end, and wherein said central bore of said first end plate includes a slot in communication with said central bore and adapted to receive said key of said shaft.

16. The moving fluid energy recovery system as set forth in claim 11, wherein said shaft includes a stop and a threaded end, said first end being positionable on said shaft until said first end contacts said stop, and wherein said shaft further comprising a nut engagable with said threaded end of said shaft for contacting said second end plate and clamping said first and second end plates between said stop and said nut when tightened.

17. The moving fluid energy recovery system as set forth in claim 11 further comprising an electricity generating device attachable to said shaft.

18. The moving fluid energy recovery system as set forth in claim 17 further comprising a fluid shield attachable to a mount on said electricity generating device and configured to enclose a portion of said inner and outer vanes, said fluid shield being stationary in relation to said inner and outer vanes, said fluid shield having a tapering inlet angle in relation to the fluid flow, and an outlet located opposite of said tapering inlet.

19. The moving fluid energy recovery system as set forth in claim 18, wherein said shield extends along the entire length of said inner and outer vanes, and is configured to allow fluid flow to contact no more than one-third the diameter of said first and second end plates.

20. A method of making a moving fluid energy recovery system, said method comprising the steps of:
(a) providing a moving fluid energy recovery system comprising: at least one elongated inner vane having a substantially curved profile featuring a curve side, and an open side; at least one elongated outer vane having a substantially curved profile featuring a curve side, and an open side; a first and second end plate each having a central bore defined therethrough, at least one inner vane slot, and at least one outer vane slot, said inner vane slot of said first and second end plates being configured to receive said inner vane therebetween, said outer vane slot of said first and second end plates being configured to receive said outer vane therebetween, said inner vane slot being orientated with said curve side of said inner vane toward said central bore of said first and second end plates, said outer vane slot being orientated with said open side of said outer vane toward said central bore of said first and second end plates and with at least one edge of said inner vane in an interior of said open side of said outer vane; and at least one shaft adapted to be received by said central bore of at least said first end plate;
(b) forming said first and second plates into a substantially circular configuration;
(c) marking the center of said first end plate;
(d) marking an equilateral pentagon on said first end plate and centered around said center mark of step (c);
(e) marking lines from said center mark of step (c) to each pentagon side intersection point of said pentagon of step (d);
(f) marking outlines of said inner vane on said first plate with a midway of said inner vane outline being positioned on each of said lines of step (e) so that a curved side of each of said outlines face toward said center mark of step (c);
(g) cutting out material from each of said outlines of step (f) from said first end plate to form said inner vane slots;
(h) marking lines from said center mark of step (c) to each pentagon side midway point of said pentagon;
(i) marking outlines of said outer vane on said first plate with a midway of said outer vane outline being positioned on each of said lines of step (h) so that an open side of each of said outer vane outlines face toward said center mark of step (c), wherein said outer vane outlines are positioned to form a gap between adjacent outer vane outlines with ends of adjacent inner vane slots of step (g) in an interior of said open sides of said outer vane outlines respectively;
(j) cutting out material from each of said outlines of step (i) from said first end plate to form said outer vane slots;
(k) drilling a bore at said center mark of step (c) through said first end plate sized to receive said shaft;
(l) repeating steps (c-k) to said second end plate;
(m) inserting said inner vane into each of said inner vane slots of step (g);
(n) inserting said outer vane into each of said outer vane slots of step (j); and
(o) attaching said shaft to said first or second end plates and coupling said shaft to an electricity generating device.

* * * * *